United States Patent
Kwon et al.

(10) Patent No.: US 7,286,501 B2
(45) Date of Patent: Oct. 23, 2007

(54) APPARATUS FOR TRANSMITTING/RECEIVING DATA ON PACKET DATA CONTROL CHANNEL IN A COMMUNICATION SYSTEM

(75) Inventors: Hwan-Joon Kwon, Seoul (KR); Ho-Kyu Choi, Songnam-shi (KR); Dong-Hee Kim, Seoul (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1046 days.

(21) Appl. No.: 10/289,688

(22) Filed: Nov. 7, 2002

(65) Prior Publication Data

US 2003/0086385 A1    May 8, 2003

(30) Foreign Application Priority Data

Nov. 7, 2001    (KR) ............. 10-2001-0069308

(51) Int. Cl.
  *H04B 7/216* (2006.01)
  *H04B 7/212* (2006.01)
  *H04Q 7/00* (2006.01)
  *H04Q 7/28* (2006.01)

(52) U.S. Cl. .......... 370/320; 370/321; 370/347; 370/441; 370/442; 370/329; 370/341

(58) Field of Classification Search ........ 370/320, 370/321, 347, 441, 442, 329, 341
See application file for complete search history.

(56) References Cited

U.S. PATENT DOCUMENTS

| | | | | |
|---|---|---|---|---|
| 6,597,680 | B1* | 7/2003 | Lindskog et al. | 370/347 |
| 6,804,220 | B2* | 10/2004 | Odenwalder et al. | 370/337 |
| 2003/0063595 | A1* | 4/2003 | You et al. | 370/342 |
| 2003/0063606 | A1* | 4/2003 | Odenwalder et al. | 370/389 |
| 2003/0072305 | A1* | 4/2003 | Odenwalder et al. | 370/389 |
| 2004/0146028 | A1* | 7/2004 | Hsu et al. | 370/335 |

* cited by examiner

*Primary Examiner*—Barry Taylor
(74) *Attorney, Agent, or Firm*—The Farrell Law Firm, P.C.

(57) ABSTRACT

An apparatus and method for transmitting/receiving a PDCCH (Packet Data Control Channel) for efficient packet data transmission in a communication system supporting packet data service. To allow both TDM-transmission and TDM/CDM-transmission of packet data, PDCCHs having different control information are transmitted. A 1PDCCH and a 2PDCCH are selectively transmitted according to the channel environments of users to thereby minimize the transmission power of the 1PDCCH and the 2PDCCH. A PDCCH receiver receives the 1PDCCH and the 2PDCCH using Walsh functions assigned to them, demodulates them, and checks errors in them, thereby obtaining control information about packet data to be received.

9 Claims, 7 Drawing Sheets

US 7,286,501 B2

APPARATUS FOR TRANSMITTING/RECEIVING DATA ON PACKET DATA CONTROL CHANNEL IN A COMMUNICATION SYSTEM

PRIORITY

This application claims priority to an application entitled "Apparatus for Transmitting/Receiving Data on Packet Data Control Channel in a Communication System" filed in the Korean Industrial Property Office on Nov. 7, 2001 and assigned Serial No. 2001-69308, the contents of which are hereby incorporated herein by reference.

BACKGROUND OF THE INVENTION

1. Field of the Invention

The present invention relates generally to an apparatus and method for providing a packet data service in a communication system, and in particular, to a packet data transmitting/receiving apparatus and method for detecting a packet data transmission/reception scheme.

2. Description of the Related Art

While a typical mobile communication system supports voice service only, user needs and the development of mobile communication technology have brought a mobile communication system that additionally supports data service.

In a mobile communication system supporting multimedia service including voice and data services, a plurality of users receive voice service in the same frequency band, and data service in TDM (Time Division Multiplexing) or TDM/CDM (Time Division Multiplexing/Code Division Multiplexing). TDM and TDM/CDM differ in the number of users serviced for a predetermined transmission period.

In a CDMA (Code Division Multiple Access) mobile communication system, a data channel delivers data to one user for a predetermined time period, using all available spreading codes in TDM. On the other hand, the data channel delivers data to two or more users for the predetermined time period in TDM/CDM. Some of the available spreading codes are separately used to spread data for the users to identify their data. Therefore, information about the spreading codes used for users is transmitted to them in a different manner according to TDM or TDM/CDM.

The mobile communication system adopts a PDCH (Packet Data Channel) and a PDCCH (Packet Data Control Channel). The PDCH delivers packet data on a PLP (Physical Layer Packet) basis. PLP length is variable. The PDCCH delivers control information about the PDCH, that is, a preamble. To allow a receiver to efficiently receive packet data on the PDCH, the preamble contains necessary control information. The length of the preamble depends on the length of packet data transmitted on the PDCH. In other words, once the receiver estimates the length of the preamble, it can determine the packet data length. The preamble length is estimated by so-called BSD (Blind Slot Detection).

FIG. 1 is a block diagram of a conventional PDCCH transmitter when only TDM is supported for PDCH transmission.

Referring to FIG. 1, it is assumed that control information is transmitted on the PDCCH, a PDCCH input sequence is 13 bits for N slots (N is 1, 2 or 4), but not limited to 13 bits. The slot length of the PDCCH input sequence varies according to the slot length of packet data but is determined irrespective of the length of a preamble. For example, if the packet data length is one of 1, 2, 4, and 8 slots, the preamble has a corresponding length. If the packet data is transmitted in 1 slot, a 1-slot preamble is transmitted. If the packet data is transmitted in 2 slots, the preamble is also 2 slots. If the packet data occupies 4 slots, the preamble is also transmitted in 4 slots. However, if the packet data is 8 slots, a 4-slot preamble is transmitted to avoid an excessive increase in the preamble length.

In operation, a CRC adder 101 adds eight CRC bits to the 13-bit PDCCH input sequence. As the number of CRC bits increases, transmission error detection performance increases. Yet, power efficiency decreases. Thus eight CRC bits are usually used.

A tail bit adder 102 adds eight tail bits with all 0s to the CRC-attached control information received from the CRC adder 101. A convolutional encoder 103 encodes the output of the tail bit adder 102 at a code rate (R) of ½ for N=1, and at a code rate R of ¼ for N=2 or 4. Hereinafter, N indicates the slot length of control information on the PDCCH. A preamble has twice as many symbols after R=¼ encoding than after R=½ encoding, and a four-slot preamble needs to have twice as many symbols than a two-slot preamble. Therefore, a symbol repeater 104 repeats the four-slot preamble correspondingly. That is, the symbol repeater 104 simply outputs input data or repeats it once or twice or four according to the slot length of the data. As a result, the symbol repeater 104 outputs 58 N (N is 1, 2 or 4) symbols.

A puncturer 105 punctures 10N symbols in the output of the symbol repeater 104 and outputs 48N symbols to minimize performance degradation and match to a desired data rate. An interleaver 106 interleaves the punctured symbols to permute the sequence of the symbols and thus reduce burst error rate. A BRI (Bit Reverse Interleaver) can be used as the interleaver 106. The BRI functions to maximize the space between adjacent symbols. After interleaving, the first half of the symbol sequence has even-numbered symbols and the second half, odd-numbered symbols. A modulator 107 modulates the interleaved symbols in a modulation scheme such as QPSK (Quadrature Phase Shift Keying).

FIG. 2 is a block diagram of a conventional PDCCH receiver. Referring to FIG. 2, to determine the number of slots in which packet data is received from the transmitter, the receiver includes first to fourth reception units 210 to 240. The slot length of the packet data is determined through the CRC-check of the received data in the first to fourth reception units 210 to 240. The first reception unit 210 processes a one-slot preamble for one-slot packet data, the second reception unit 220 processes a two-slot preamble for two-slot packet data, the third reception unit 230 processes a four-slot preamble for four-slot packet data, and the fourth reception unit 240 processes a four-slot preamble for eight-slot packet data.

In each reception unit, a deinterleaver deinterleaves the received packet data according to a corresponding slot length and a depuncturer depunctures the deinterleaved symbols according to the slot length. In the third and fourth reception units 230 and 240, combiners 235 and 245 combine two consecutive symbols in correspondence to the operation of the symbol repeater 104 illustrated in FIG. 1.

A convolutional decoder 216 decodes the depunctured symbols received from the depuncturer 214 at a code rate of ½, a convolutional decoder 226 decodes the depunctured symbols received from the depuncturer 224 at a code rate of ¼, and convolutional decoders 236 and 246 decode the combined symbols received from the combiners 235 and 245 at a code rate of ¼.

CRC checkers 218 to 248 CRC-check the decoded symbols using predetermined initial values. A packet length determiner 250 determines the slot length of the packet data according to the reception results received from the reception units 210 to 240. The reception units 210 to 240 may be separated physically or integrated into one reception unit with different reception parameters.

FIG. 3 is a diagram illustrating slot detection timing and slot lengths when the receiver illustrated in FIG. 2 receives the PDCCH. As noted from FIG. 3, the first to fourth reception units 210 to 240 operate for N=1, 2 or 4.

As described above, the conventional PDCCH supports only TDM transmission of the PDCH. Therefore, there is a need for a novel PDCCH to support TDM/CDM transmission of the PDCH.

SUMMARY OF THE INVENTION

It is, therefore, an object of the present invention to provide a PDCCH transmitting/receiving apparatus for supporting transmission of a PDCH in TDM/CDM.

It is another object of the present invention to provide an apparatus and method for transmitting/receiving control information on a PDCCH in variable slots according to the length of packet data.

It is a further object of the present invention to provide an apparatus and method for transmitting/receiving control information on a PDCCH in variable slots according to the length of packet data, to thereby offer the benefit of channel protection.

To achieve the above and other objects, according to one aspect of the present invention, to transmit packet data control information having a variable length according to the length of packet data in a transmitting apparatus of a BS, which has an orthogonal code space with a plurality of orthogonal codes arranged, and transmits packet data spread with the orthogonal codes to a single MS or simultaneously transmits to two or more MSs packet data spread with different orthogonal codes in the orthogonal code space, a first transmitter transmits on a 1PDCCH1 PDCCH first packet data control information including information indicating one of at least two MSs that receive packet data and primary orthogonal code allocation information indicating the first orthogonal code to a predetermined numbered orthogonal code available to the MS in the orthogonal code space, and a second transmitter transmits on an 2PDCCH second packet data control information including information indicating the other MS, the primary orthogonal code allocation information, and secondary orthogonal code allocation information indicating orthogonal codes available to the other MS in the orthogonal code space.

After error detection bits are generated using the MS indicating information and added to the primary packet data control information, the primary and secondary packet data control information excluding the MAC ID is transmitted on the 1PDCCH and on the 2PDCCH2PDCCH2PDCCH.

According to another aspect of the present invention, to transmit packet data control information having a variable length according to the length of packet data in a transmitting apparatus of a BS which has an orthogonal code space with a plurality of orthogonal codes arranged, and transmits packet data spread with the orthogonal codes to a single MS or simultaneously transmits to two or more MSs packet data spread with different orthogonal codes in the orthogonal code space, an error detection bit adder generates predetermined symbols by adding error detection bits to control information to be transmitted on each control channel corresponding to each packet data channel for simultaneous packet transmission to at least two MSs and information indicating each of the MSs. A tail bit adder adds tail bits in a predetermined pattern to the symbols for each error detection bit-added data, an encoder encodes the tail bit-added symbols at different code rates according to the number of transmission slots of the control channels, a repeater repeats the code symbols received from the encoder according to the number of transmission slots of the control channels, a puncturer punctures the repeated symbols according to the control channels and the number of transmission slots of the control channels, and a controller generates the control information and the MS indicating information and controls each device in the transmitting apparatus.

According to a further aspect of the present invention, to receive packet data control information having a variable length according to the length of packet data in an MS from a BS that has an orthogonal code space with a plurality of orthogonal codes arranged, and transmits packet data spread with the orthogonal codes to a single MS or simultaneously transmits to two or more MSs packet data spread with different orthogonal codes in the orthogonal code space in a mobile communication system, a 1PDCCH1PDCCH reception portion has first, second and third reception units, and an 2PDCCH2PDCCH reception portion has fourth, fifth and sixth reception units. The first reception unit receives one-slot packet data control information for one user on a 1PDCCH1PDCCH and the MAC ID of the MS, decodes the one-slot packet data control information, checks errors in the decoded packet data control information, and outputs a first error detection signal. The second reception unit receives two-slot packet data control information for one user on the 1PDCCH and the MAC ID of the MS, decodes the two-slot packet data control information, checks errors in the decoded packet data control information, and outputs a second error detection signal. The third reception unit receives four-slot packet data control information for one user on the 1PDCCH and the MAC ID of the MS, decodes the four-slot packet data control information, checks errors in the decoded packet data control information, and outputs a third error detection signal. The fourth reception unit receives one-slot packet data control information for two users on an 2PDCCH and the MAC ID of the MS, decodes the one-slot packet data control information, checks errors in the decoded packet data control information, and outputs a fourth error detection signal. The fifth reception unit receives two-slot packet data control information for two users on the 2PDCCH and the MAC ID of the MS, decodes the two-slot packet data control information, checks errors in the decoded packet data control information, and outputs a fifth error detection signal. The sixth reception unit receives four-slot packet data control information for two users on the 2PDCCH and the MAC ID of the MS, decodes the four-slot packet data control information, checks errors in the decoded packet data control information, and outputs a sixth error detection signal. A MAC ID inserter feeds the MAC ID to the 1PDCCH reception portion and the 2PDCCH reception portion. A controller receives the first to sixth error detection signals and determines whether packet data has been received on a PDCH.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The following description is made with the appreciation that control information on a PDCCH is a preamble including information about the length of packet data transmitted on a PDCH and the PDCCH is an 2PDCCH. According to an embodiment of the present invention, a transmitter is provided with a CRC adder for adding CRC bits to the control information to allow a receiver to detect errors in the control information, and the receiver operates in BSD to determine the slot length of packet data and the format of the control information. The transmitter and the receiver can be applied in the same manner to communication systems where packet data service is provided and control information is transmitted for efficient packet data transmission.

According to the present invention, the number of PDCCHs used is determined depending on whether the PDCH is transmitted in TDM/CDM and how many users are serviced by the PDCH if it is. If two users are serviced in TDM/CDM, two PDCCHs are used to deliver control information for the respective uses. In the same manner, as the number of users serviced in TDM/CDM increases, the number of PDCCHs used also increases. In the following description, it is assumed that two users are serviced if the PDCH is transmitted in TDM/CDM.

The feature of the present invention is that different packet data control information for each user is transmitted on a different PDCCH and a 1PDCCH or an 2PDCCH is selected according to the forward channel condition of the user to thereby minimize the transmission power of the PDCCH. A receiver then receives the 1PDCCH or the 2PDCCH using its Walsh function and obtains packet data control information for the user after demodulation and CRC check.

Figure 4:
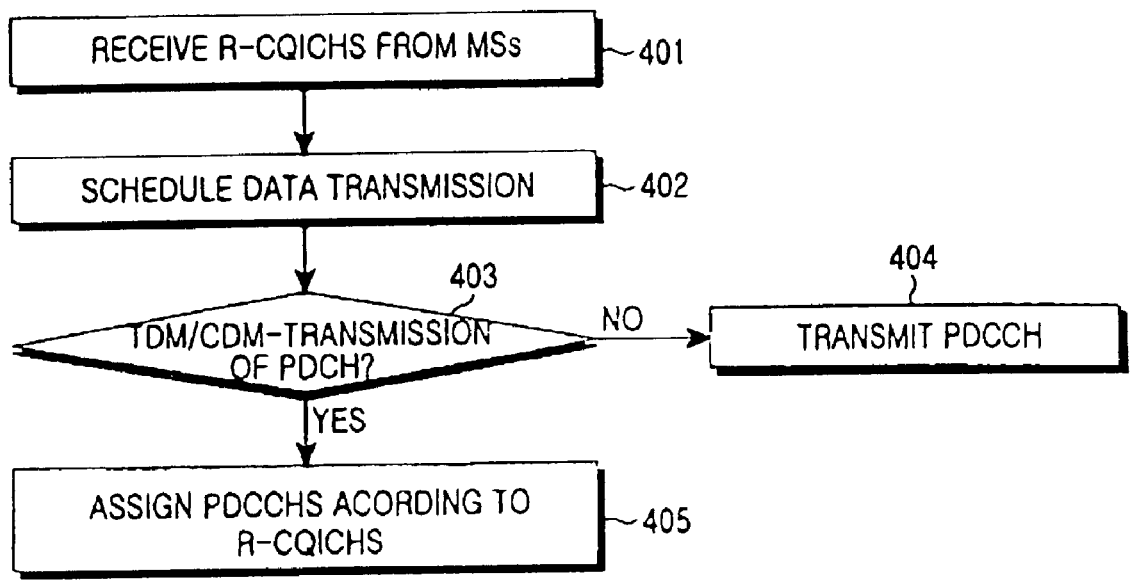
FIG. 4 is a flowchart illustrating an operation for selecting a primary PDCCH (1PDCCH) or a secondary PDCCH (2PDCCH) in a transmitter according to a preferred embodiment of the present invention.

FIG. 4 is a flowchart illustrating an operation for selecting a 1PDCCH or an 2PDCCH in a transmitter of a base station (BS) according to a preferred embodiment of the present invention. Referring to FIG. 4, the transmitter receives feedback information about forward channel condition, for example, an R-CQICH (Reverse Channel Quality Indicator Channel) from each MS (Mobile Station) in step 401. The R-CQICH contains a 5-bit CQI (Channel Quality Indicator) and a 3-bit BSI (Best Sector Indicator). The CQI indicates the C/I (Carrier-to-Interference ratio) measurement of a predetermined channel received from the BS, and the BSI indicates the best serving sector among a plurality of BSs that can service the MS. In step 402, the BS schedules a PDCH, that is, determines users to which data is to be transmitted based on necessary information including the resources state of the BS. The BS determines whether the PDCH is to be transmitted in TDM or in TDM/CDM in step 403. If the PDCH is transmitted in TDM, the BS transmits packet data control information to a corresponding user on the 1PDCCH in step 404. On the other hand, if the PDCH is transmitted in TDM/CDM, the BS assigns PDCCHs to users according to the CQICHs received from them in step 405. Specifically, the BS transmits packet data control information on the 1PDCCH to a user in the worst channel environment and on the 2PDCCH to a user in the second to worst channel environment in order to minimize the transmission power of the PDCCHs. The 1PDCCH and the 2PDCCH deliver 12-bit control information and 17-bit control information, which will be described later in more detail. Therefore, the 1PDCCH is assigned to the user in the worst channel condition because it has a relatively small amount of control information. As a result, the total transmission power of the PDCCHs is minimized.

Figure 5:
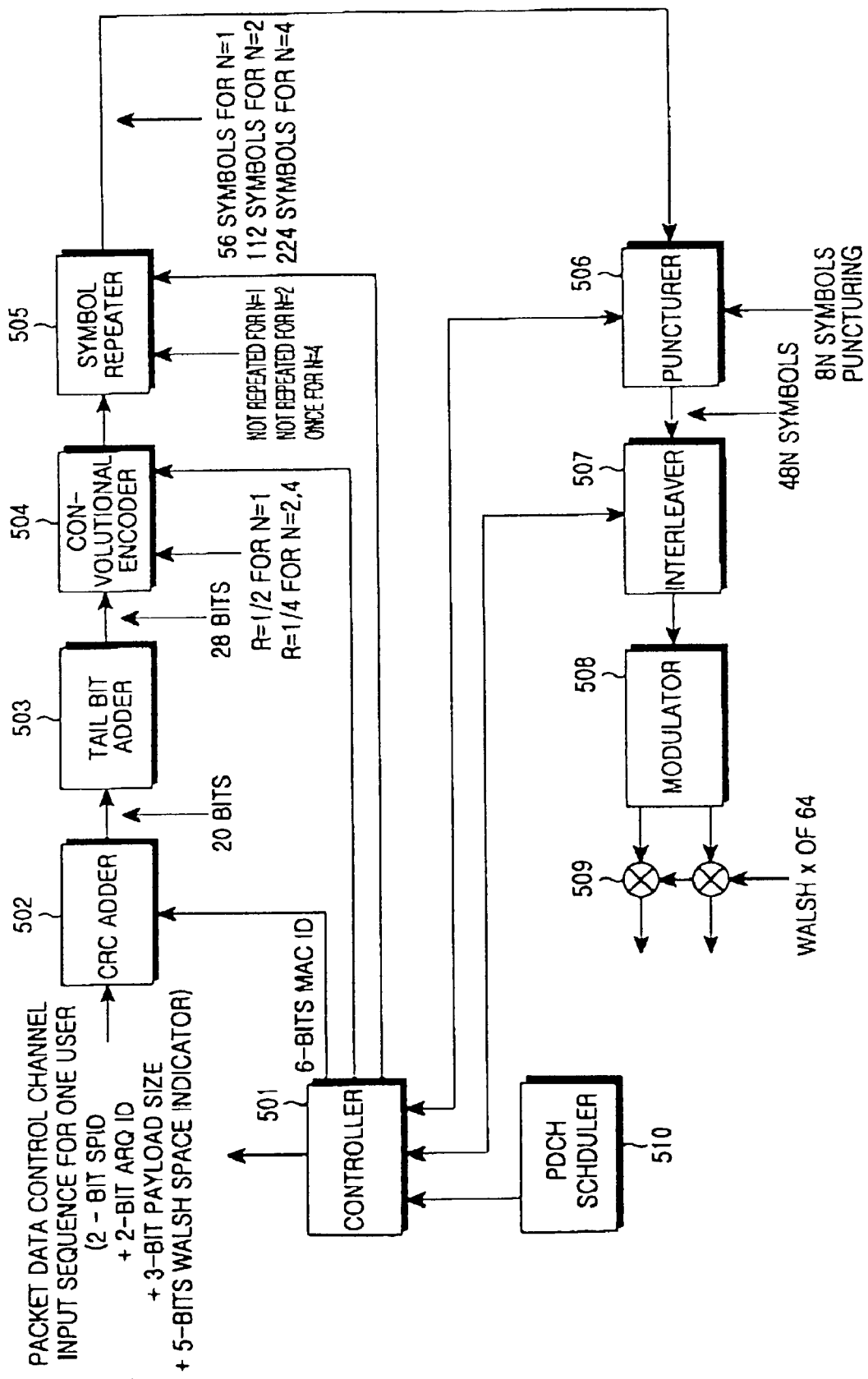
FIG. 5 is a block diagram of a transmitter for transmitting the 1PDCCH receiver according to the embodiment of the present invention.
Figure 6:
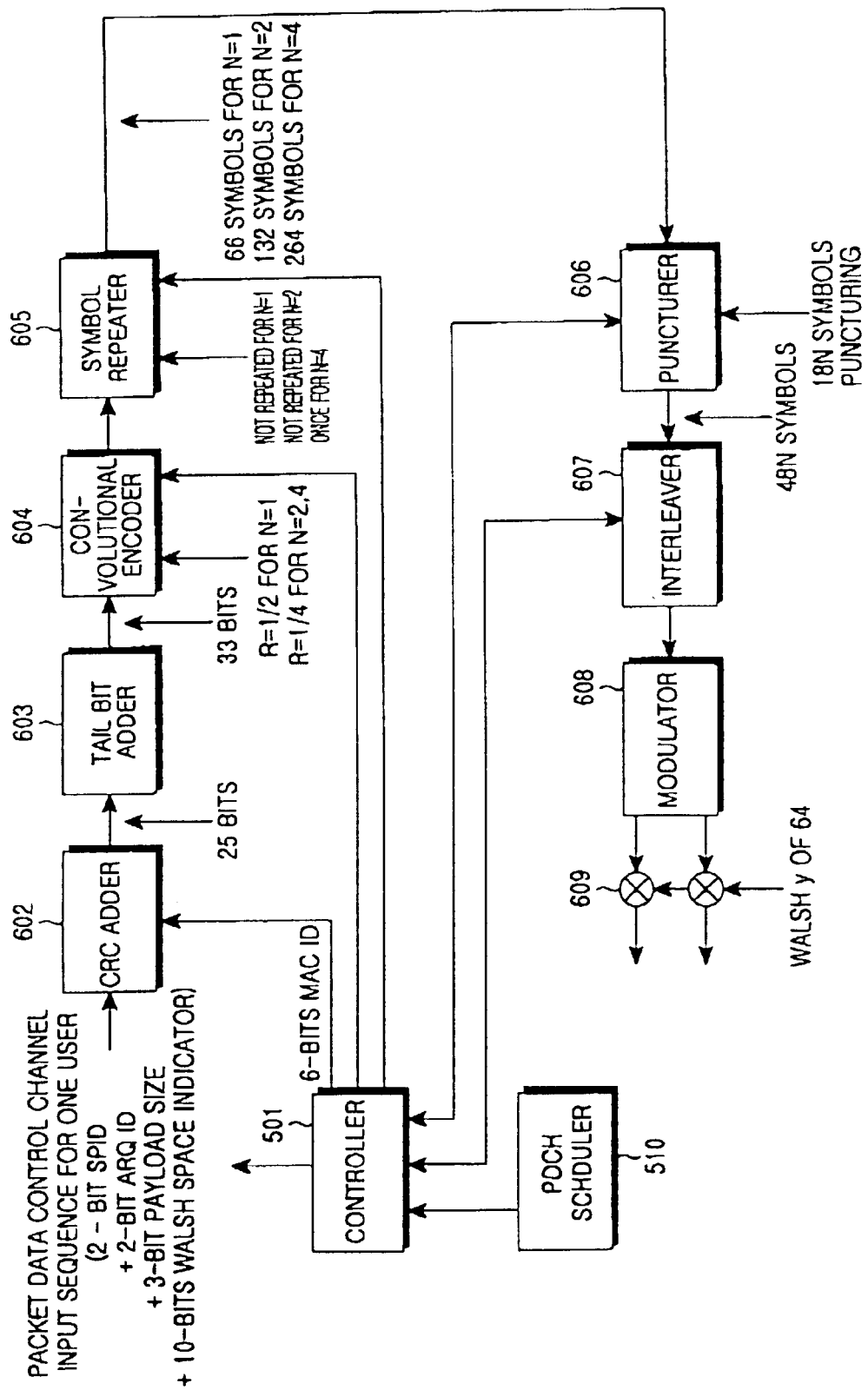
FIG. 6 is a block diagram of a transmitter for transmitting the 2PDCCH receiver according to the embodiment of the present invention.

FIGS. 5 and 6 are block diagrams of transmitters for transmitting the 1PDCCH and the 2PDCCH according to the embodiment of the present invention. The 1PDCCH transmitter transmits control information on the PDCCH to a first user irrespective of TDM-transmission or TDM/CDM-transmission of packet data on the PDCH. The 2PDCCH transmitter transmits control information on the 2PDCCH to a second user only when the PDCH is transmitted in TDM/CDM. The control information of a PDCCH contains information about spreading codes (Walsh codes) used for a user, that is, Walsh code allocation information. According to the present invention, the Walsh code allocation information is transmitted in a different manner depending on the 1PDCCH or the 2PDCCH. To indicate a length 32 Walsh code, 5-bit Walsh code allocation information is used. For example, the first Walsh code, that is, Walsh code #0 to a predetermined numbered Walsh code in a given Walsh code space are assigned to a primary PDCH (PPDCH). Therefore, the 1PDCCH notifies only the index of the last Walsh code by 5-bit Walsh code allocation information because the starting Walsh code for the PPDCH is always Walsh code #0. Meanwhile, the 2PDCCH uses 10-bit Walsh code allocation information to indicate the indexes of starting and ending Walsh codes assigned to a secondary PDCH (SPDCH). Since Walsh codes are first assigned to the PPDCH, the starting Walsh code is variable for the SPDCH. Therefore, the 2PDCCH must indicate both the starting and ending Walsh codes, as compared to the 1PDCCH.

Referring to FIG. 5, upon receipt of information about the length of a PDCH and whether the PDCH is transmitted in TDM/CDM at a particular time point from a PDCH scheduler 510, a controller 501 controls the input/output and parameters of each block. If the PDCH is transmitted in TDM/CDM, the controller 501 controls the blocks illustrated in FIG. 5 and the blocks illustrated in FIG. 6 contemporaneously. In FIG. 5, a 1PDCCH input sequence is input to the transmitter. According to the slot length of a preamble, the controller 501 sets a code rate and a repetition factor.

The 1PDCCH input sequence is 12 bits for N slots (N is 1, 2 or 4), including a 2-bit SPID (Sub-Packet ID), a 2-bit ARQ ID (Automatic Repeat Request ID), a 3-bit payload size, and 5-bit Walsh code allocation information. It is to be noted that the 1PDCCH input sequence is not limited to 12 bits and its bit number is independent of the slot length of the preamble. The Walsh code allocation information added according to the present invention indicates Walsh codes used for the PDCH to the user. The preamble length varies according to the length of packet data. For example, if the packet data is transmitted in one of 1, 2, 4 and 8 slots, the preamble has a corresponding length. For example, if the packet data is transmitted in one slot, a one-slot preamble is transmitted. If the packet data is transmitted in 2 slots, the preamble is transmitted in 2 slots. If the packet data occupies 4 slots, the preamble is also transmitted in 4 slots. However, if the packet data is 8 slots, a 4-slot preamble is transmitted to avoid an excessive increase of the preamble length. The 4-slot packet data and the 8-slot packet data are discriminated by using different initial CRC values in corresponding preambles.

Figure 1:
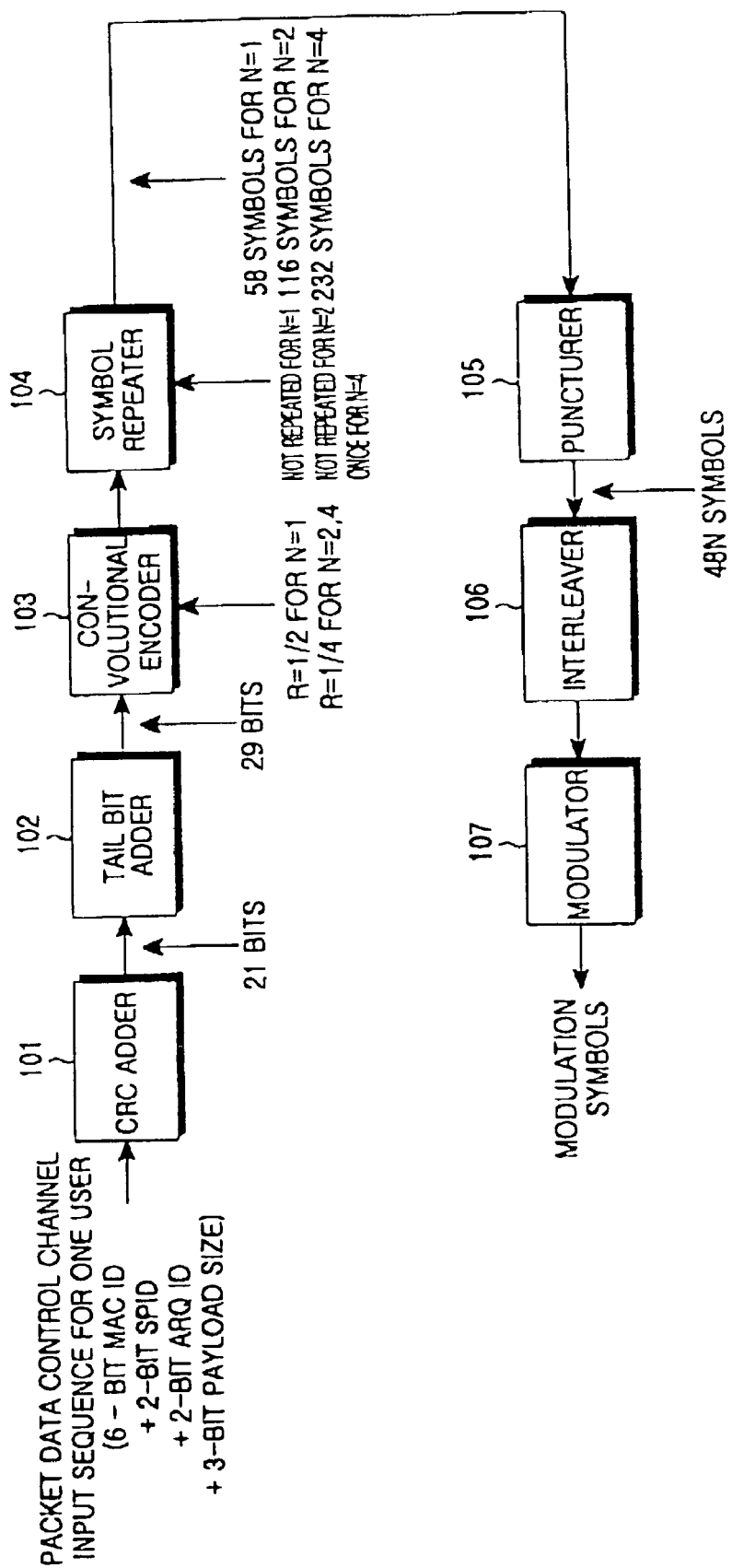
FIG. 1 is a block diagram of a conventional PDCCH transmitter.
Figure 2:
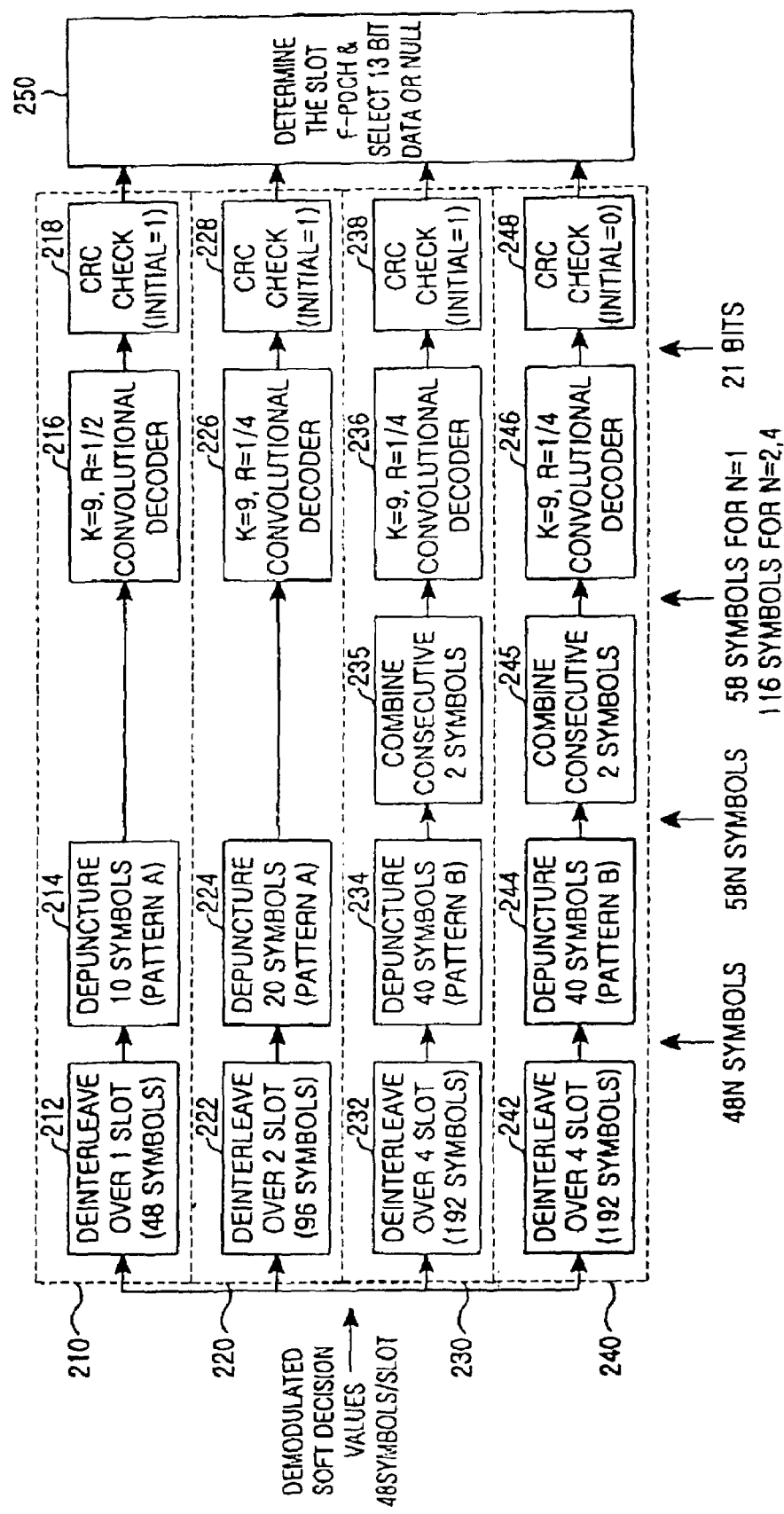
FIG. 2 is a block diagram of a conventional PDCCH receiver.
Figure 3:
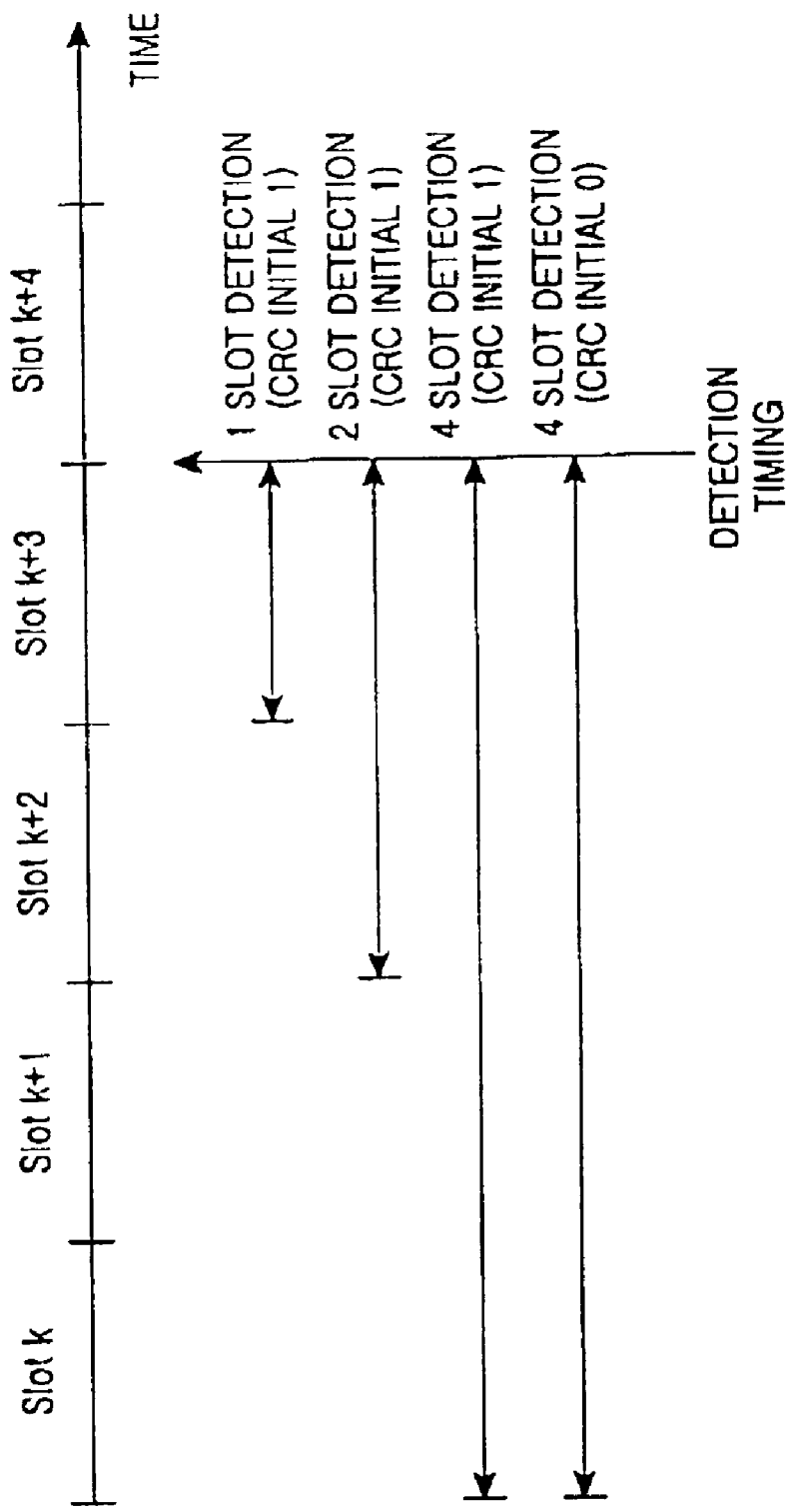
FIG. 3 is a diagram illustrating slot lengths and slot detection timing when a PDCCH is received in 1, 2 or 4 slots at the receiver illustrated in FIG. 2.

As compared to the conventional PDCCH input sequence illustrated in FIG. 1, a MAC ID is not transmitted on the 1PDCCH in the present invention. Instead, a CRC adder 502 receives the 12-bit 1PDCCH input sequence and a 6-bit MAC ID and adds 8 CRC bits to the received data.

A tail bit adder 503 adds 8 tail bits with all 0s to the 20-bit control information received from the CRC adder 502 to facilitate convolutional encoding.

A convolutional encoder 504 encodes the output of the tail bit adder 503 at a code rate of ½ for N=1, and at a code rate of ¼ for N=2 or 4. A symbol repeater 505 simply outputs the code symbols without repetition for N=1 or 2, and repeats them once for N=4. Therefore, the symbol repeater 505 outputs 56, 112, and 224 symbols for N=1, 2 and 4, respectively.

A puncturer 506 punctures 8, 16, and 32 symbols in the output of the symbol repeater 505 for N=1, 2, and 4, respectively in order to minimize performance degradation and match to an appropriate data rate. An interleaver 507 interleaves the punctured symbols and a modulator 508 modulates the interleaved symbols in a modulation scheme such as QPSK (Quadrature Phase Shift Keying). A Walsh spreader 509 spreads the modulation symbols with a length 64 Walsh code assigned to the 1PDCCH.

Referring to FIG. 6, the controller 501 is identical to the controller 501 illustrated in FIG. 5. Upon receipt of information about the length of a PDCH and whether the PDCH is transmitted in TDM/CDM at a particular time point from the PDCH scheduler 510, the controller 501 controls the input/output and parameters of each block. A 2PDCCH input sequence is input to the transmitter. According to the slot length of a preamble, the controller 501 sets a code rate and a repetition factor.

The 2PDCCH input sequence is 17 bits for N slots (N is 1, 2 or 4), including a 2-bit SPID (Sub-Packet ID), a 2-bit ARQ ID (Automatic Repeat Request ID), a 3-bit payload size, and 10-bit Walsh code allocation information. It is to be noted that the 2PDCCH input sequence is not limited to 17 bits and its bit number is independent of the slot length of the preamble. The Walsh code allocation information added according to the present invention indicates Walsh codes used for the PDCH to the user. The preamble length varies according to the length of packet data. For example, if the packet data is transmitted in one of 1, 2, 4 and 8 slots, the preamble has a corresponding length. For example, if the packet data is transmitted in one slot, a one-slot preamble is transmitted. If the packet data is transmitted in 2 slots, the preamble is transmitted in 2 slots. If the packet data occupies 4 slots, the preamble is also transmitted in 4 slots. However, if the packet data is 8 slots, a 4-slot preamble is transmitted to avoid an excessive increase of the preamble length.

As compared to the conventional PDCCH input sequence illustrated in FIG. 1, a MAC ID is not transmitted on the 2PDCCH in the present invention. Instead, a CRC adder 602 receives the 17-bit 1PDCCH input sequence and a 6-bit MAC ID and adds 8 CRC bits to the received data.

A tail bit adder 603 adds 8 tail bits with all 0s to the 25-bit control information received from the CRC adder 602 to facilitate convolutional encoding.

A convolutional encoder 604 encodes the output of the tail bit adder 503 at a code rate of ½ for N=1, and at a code rate of ¼ for N=2 or 4. A symbol repeater 605 simply outputs the code symbols without repetition for N=1 or 2, and repeats them once for N=4. Therefore, the symbol repeater 605 outputs 66, 132, and 264 symbols for N=1, 2 and 4, respectively.

A puncturer 606 punctures 18, 36, and 72 symbols in the output of the symbol repeater 605 for N=1, 2, and 4, respectively in order to minimize performance degradation and match to an appropriate data rate. An interleaver 607 interleaves the punctured symbols and a modulator 608 modulates the interleaved symbols in a modulation scheme such as QPSK (Quadrature Phase Shift Keying). A Walsh spreader 609 spreads the modulation symbols with a length 64 Walsh code assigned to the 2PDCCH.

Figure 7:
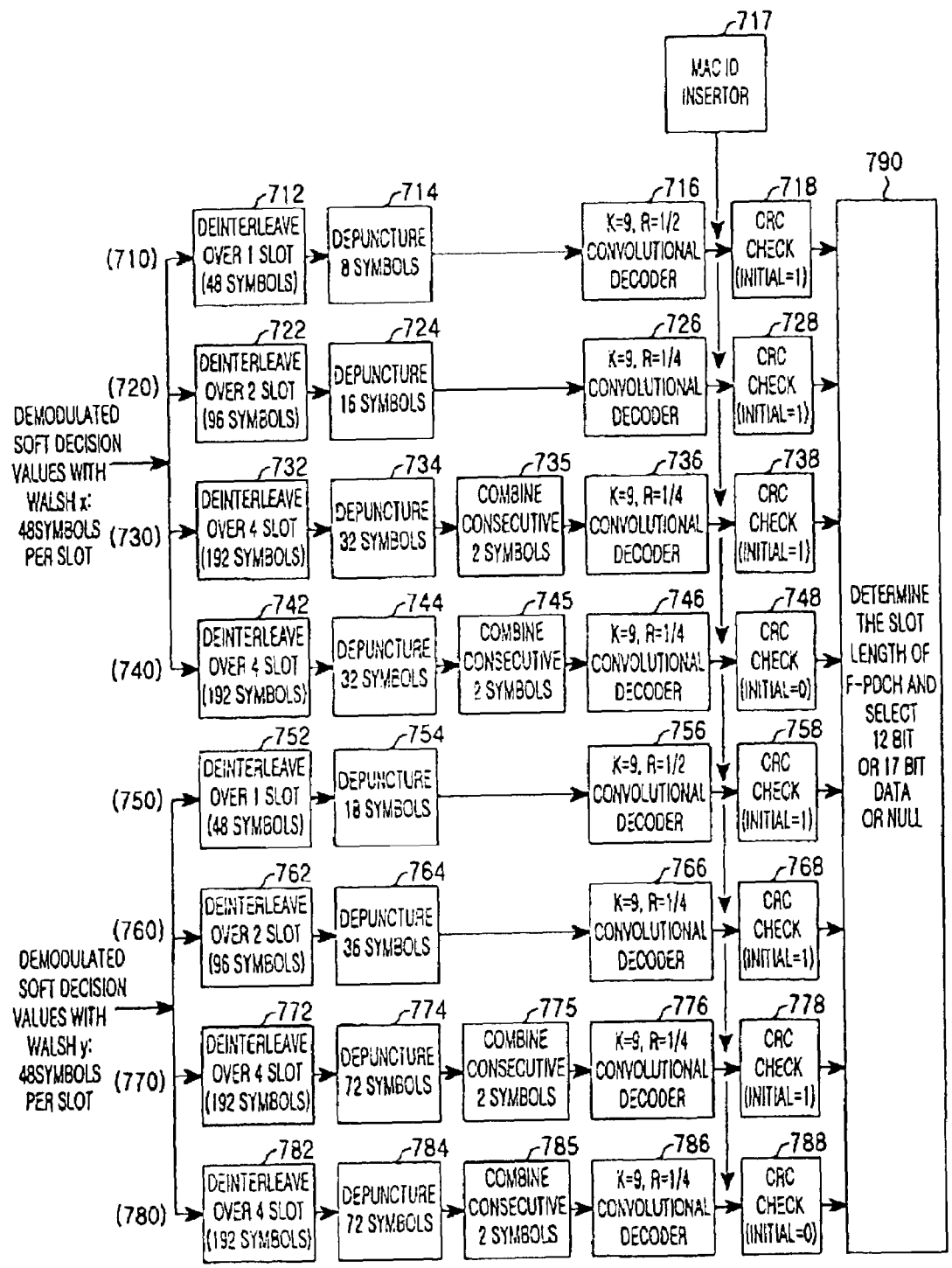
FIG. 7 is a block diagram of a receiver for receiving PDCCHs according to the embodiment of the present invention.

FIG. 7 is a block diagram of a PDCCH receiver according to the embodiment of the present invention. Referring to FIG. 7, to detect the slot length of packet data received from the transmitter, the receiver includes four kinds of reception units for each PDCCH, that is, first to eighth reception units 710 to 780 for two PDCCHs. The first to eighth reception units 710 to 780 CRC-check the received packet data, so that a packet length and control information detector 790 determines the slot length of the packet data, determines whether the 1PDCCH or the 2PDCCH has been received, and then detects control information from the PDCCH.

The first reception unit 710 processes a 1-slot preamble on the 1PDCCH for 1-slot packet data, the second reception unit 720 processes a 2-slot preamble on the 1PDCCH for 2-slot packet data, the third reception unit 730 processes a 4-slot preamble on the 1PDCCH for 4-slot packet data, the fourth reception unit 740 processes a 4-slot preamble on the 1PDCCH for 8-slot packet data, the fifth reception unit 750 processes a 1-slot preamble on the 2PDCCH for 1-slot packet data, the sixth reception unit 760 processes a 2-slot preamble on the 2PDCCH for 2-slot packet data, the seventh reception unit 770 processes a 4-slot preamble on the 2PDCCH for 4-slot packet data, and the eighth reception unit 780 processes a 4-slot preamble on the 2PDCCH for 8-slot packet data.

In each reception unit, a deinterleaver deinterleaves data received according to a corresponding slot length and a depuncturer depunctures the deinterleaved symbols according to the corresponding slot length. That is, the depuncturer inserts symbols punctured in the puncturer 506 or 606 illustrated in FIG. 5 or FIG. 6 according to the slot length in the reception unit of the depuncturer. In the third, fourth, seventh and eighth reception units 730, 740, 770 and 780, combiners 735, 745, 775 and 785 combine every two adjacent symbols in correspondence to the operation of the symbol repeaters 505 and 605 illustrated in FIGS. 5 and 6.

First and fifth convolutional decoders 716 and 756 decode the depunctured symbols received from the depuncturers 714 and 754 at a code rate of ½ with respect to 1-slot preambles. With respect to 2-slot preambles, the second and sixth convolutional decoders decode the depunctured symbols received from the depuncturers 724 and 764 at a code rate of ¼. With respect to 4-slot preambles, the third, fourth, seventh, and eighth convolutional decoders 736, 746, 776 and 786 decode the combined symbols received from the combiners 735, 745, 775, and 785 at a code rate of ¼.

A MAC ID inserter 717 inserts the 6-bit MAC ID of the receiving MS to he outputs of the convolutional decoders 716 to 786. The transmitters illustrated in FIGS. 5 and 6 generate CRC bits for a PDCCH input sequence and a MAC ID and exclude the MAC ID in control information transmitted on the 1PDCCH and the 2PDCCH The receiver inserts the MAC ID, for CRC check. Thus while the transmitter does not transmit the MAC ID, the receiver can determine whether a packet is directed to it by a CRC check.

CRC checkers 718 to 788 CRC-check decoded symbols including the MAC ID using predetermined initial values. The packet length and control information detector 790 determines the length of received packet data and packet data control information. The reception units 710 to 780 may be separated physically or integrated into one reception unit with different reception parameters.

In accordance with the present invention as described above, the proposed PDCCHs enable both TDM/TDM packet transmission and TDM/CDM packet transmission on the PDCH in a mobile communication system supporting packet data service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting in a transmitting apparatus of a base station (BS) packet data control information having a variable length according to the length of packet data, the BS having an orthogonal code space within which a plurality of orthogonal codes are arranged, and transmitting packet data spread with the orthogonal codes to a single mobile station (MS), or simultaneously transmits to two or more MSs packet data spread with different orthogonal codes in the orthogonal code space, the method comprising the steps of:

transmitting on a primary packet data control channel (1PDCCH) primary packet data control information including information indicating one of at least two MSs that receive packet data and primary orthogonal code allocation information indicating a first orthogonal code of a predetermined numbered orthogonal code available to the MS in the orthogonal code space; and transmitting on a secondary packet data control channel (2PDCCH) secondary packet data control information including information indicating the other MS, the primary orthogonal code allocation information, and secondary orthogonal code allocation information indicating orthogonal codes available to the other MS in the orthogonal code space.

2. The method of claim 1, wherein the 1PDCCH and the 2PDCCH are transmitted simultaneously.

3. The method of claim 1, wherein the MS indicating information transmitted on the 1PDCCH includes an SPID (Sub-Packet Identification), an ARQ ID (Automatic Repeat Request ID), a payload size, and a MAC ID (Medium Access Control ID).

4. The method of claim 3, wherein after error detection bits are generated using the MS indicating information and added to the primary packet data control information, the primary packet data control information excluding the MAC ID is transmitted on the 1PDCCH.

5. The method of claim 1, wherein the MS indicating information transmitted on the 2PDCCH includes an SPID, an ARQ ID, a payload size, and a MAC ID.

6. The method of claim 5, wherein after error detection bits are generated using the MS indicating information and added to the secondary packet data control information, the secondary packet data control information excluding the MAC ID is transmitted on the 2PDCCH.

7. The method of claim 1, wherein the 1PDCCH and the 2PDCCH are spread with different Walsh codes.

8. The method of claim 1, wherein the 1PDCCH is transmitted to a user in the worst channel environment among users to which packet data is transmitted.

9. An apparatus in a base station (BS) for transmitting packet data control information having a variable length according to the length of packet data, the BS having an orthogonal code space arranged with a plurality of orthogonal codes, and transmitting packet data spread with the orthogonal codes to a single mobile station (MS), or simultaneously transmits to two or more MSs packet data spread with different orthogonal codes in the orthogonal code space, the apparatus comprising:

a first transmitter for transmitting on a primary packet data control channel (1PDCCH) primary packet data control information including information indicating one of at least two MSs that receive packet data and primary orthogonal code allocation information indicating a first orthogonal code of a predetermined numbered orthogonal code available to the MS in the orthogonal code space; and a second transmitter for transmitting on a secondary packet data control channel (2PDCCH) secondary packet data control information including information indicating the other MS, the primary orthogonal code allocation information, and secondary orthogonal code allocation information indicating orthogonal codes available to the other MS in the orthogonal code space.

* * * * *